US006966777B2

(12) United States Patent
Robotham

(10) Patent No.: US 6,966,777 B2
(45) Date of Patent: Nov. 22, 2005

(54) TOOL DEVICE, SYSTEM AND METHOD FOR TEACHING READING

(76) Inventor: Teresa Robotham, 1800 Satinwood Cir., Coconut Creek, FL (US) 33063

( * ) Notice: Subject to any disclaimer, the term of this patent is extended or adjusted under 35 U.S.C. 154(b) by 269 days.

(21) Appl. No.: 10/632,373

(22) Filed: Aug. 1, 2003

(65) Prior Publication Data

US 2004/0023194 A1 Feb. 5, 2004

Related U.S. Application Data

(60) Provisional application No. 60/400,266, filed on Aug. 1, 2002.

(51) Int. Cl.[7] .................................................. G09B 1/00
(52) U.S. Cl. ....................................... 434/167; 434/178
(58) Field of Search ............................... 434/156, 157, 434/159, 167, 170, 178

(56) References Cited

U.S. PATENT DOCUMENTS

| 2,193,048 | A |   | 3/1940  | Velde              |         |
|-----------|---|---|---------|--------------------|---------|
| 2,361,154 | A |   | 10/1944 | Schoolfield        |         |
| 2,628,435 | A |   | 2/1953  | Minninger          |         |
| 4,262,431 | A |   | 4/1981  | Darnell            |         |
| 4,345,902 | A |   | 8/1982  | Hengel             |         |
| 4,427,390 | A | * | 1/1984  | Manger, Nina       | 434/159 |
| 4,437,837 | A |   | 3/1984  | Schneittler        |         |
| 4,713,008 | A |   | 12/1987 | Stocker            |         |
| 5,133,665 | A |   | 7/1992  | Engel              |         |
| 5,269,691 | A | * | 12/1993 | Waldman            | 434/429 |
| 5,409,381 | A | * | 4/1995  | Sundberg et al.    | 434/159 |
| 5,417,432 | A | * | 5/1995  | Dwyer              | 273/299 |
| 5,618,180 | A | * | 4/1997  | Nathanson          | 434/156 |
| 5,788,503 | A |   | 8/1998  | Shapiro            |         |
| 5,863,043 | A | * | 1/1999  | Bitner             | 273/299 |
| 5,980,354 | A | * | 11/1999 | Prest              | 446/227 |
| 6,009,397 | A | * | 12/1999 | Siegel             | 704/270 |
| 6,021,306 | A | * | 2/2000  | McTaggart          | 434/317 |
| 6,041,215 | A | * | 3/2000  | Maddrell et al.    | 434/317 |
| 6,050,824 | A | * | 4/2000  | Stuart             | 434/159 |
| 6,089,943 | A | * | 7/2000  | Lo                 | 446/175 |

* cited by examiner

*Primary Examiner*—Kurt Fernstrom
(74) *Attorney, Agent, or Firm*—David P. Lhota, Esq.; Stearns Weaver Miller Weissler Alhadeff & Sitterson, P.A.

(57) ABSTRACT

A book-like reading teaching tool having a plurality of columns wherein each column contains each letter of the alphabet in ascending format, which are simultaneously viewable, a picture corresponding to each sound of each letter in the alphabet and structure for interchanging, mixing and matching letters and identifying and selecting long vowel and short vowel sounds. The reading tool includes a front cover, back cover, spiral binder, instructions, alphabet indicia, plurality of pictures corresponding to each letter and sound in the alphabet, plurality of windows or cutouts corresponding to selected letters and sounds, short vowel sound indicia, long vowel sound indicia and plurality of flip panels arranged in columns wherein each panel in each column contains a letter indicia. The covers, pages and panels have a plurality of apertures that are joined at coinciding ends by the spiral binder. The windows are formed in the second page over pictures corresponding to letters having only one sound or one common sound, such as the letter "B." The instructions indicate how to form words and sounds using the panels and also include suggested beginning sounds, set of suggested complex beginning sounds, set of suggested ending sounds and set of suggested complex ending sounds.

6 Claims, 4 Drawing Sheets

TOOL DEVICE, SYSTEM AND METHOD FOR TEACHING READING

CROSS REFERENCE TO RELATED APPLICATIONS

This Application claims the benefit of provisional patent application 60/400,266 filed Aug. 1, 2002.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to a book, and more particularly, to a device, system and method for teaching people how to read in the form of a book that readers can interact with and manipulate to form a plurality of words using all letters and sounds of the alphabet.

2. Description of the Background Art

It is well recognized that knowing how to read is vital to a person's success in society. Notwithstanding, some children have difficulty learning how to read and illiteracy among adults is still an ongoing problem in society. Reading is typically taught by teaching the sounds of letters and groups of letters in a static format and then providing books for practice. Conventional methods for teaching reading are not interactive and fail to effectively teach many children and adults. Reading could be more effectively taught if students could selectively combine letters and sounds and match various letters and sounds with recognizable pictures. If a book or tool existed that allowed students to identify the sounds of letters with recognizable pictures and formulate various words and groups of letters utilizing all letters and sounds of the alphabet, it would allow students to efficiently and selectively form words or sounds using groups of letters with a single tool. There are no devices known in the prior art have that adequately address this solution to teaching reading.

While various educational devices and methods exist for teaching children to read, they fail to teach reading in a true interactive manner and convenient, easily-manipulated format that combine images with letters that illustrate the letter's sound and gives children the tools and knowledge to interchangeably combine letters to make sounds and words as contemplated by the instant invention. For instance, U.S. Pat. No. 2,193,048, issued to Vander Velde, discloses a dictionary adapted particularly to teach children in primary school or other non-readers. The dictionary defines words with pictures. U.S. Pat. No. 2,361,154, issued to Schoolfield, discloses teaching material for American and foreign-born children, for learning speech, reading, writing, and vocabulary, which will teach them to read in the conventional direction. The invention includes master cards and a plurality of smaller cards that are used to teach recognition of initial consonants and consonant digraphs vowels, and dipthongs, in printed form, manuscript and cursive writing; sounds of letters; similarities and differences in the formation of letters; rudimentary spelling and word recognition; and neatness and precision. U.S. Pat. No. 2,638,435, issued to Minninger, discloses an educational device primarily designed as a visual aid for assisting young children to learn the art of reading and doing simple arithmetic by sight. The device affords children of both pre-school and school age to acquire substantial vocabulary of useful words, an ability to recognize such words on sight, and acquiring substantial aptitude for doing simple arithmetic. The device includes multiple layers having words displayed thereon and openings therein. U.S. Pat. No. 4,262,431, issued to Darnell, discloses a teaching device for helping children, and specifically slow learners, spelling, reading, and pronunciation. The device includes a three-tiered case having a moveable drawer on each tier; each drawer being divided into compartments. Each compartment contains a plurality of letter pieces. U.S. Pat. No. 4,345,902, issued to Hengel, discloses an educational device having color coded cards using three colors to facilitate teaching and learning the alphabet, the sounds of the alphabet letters, subsequent word skills and sight words. Each letter is marked with a color to indicate the phonetic characteristics. U.S. Pat. No. 4,437,837, issued to Schnettler, discloses an ordered group of instructional elements having a series of sentence indicia thereon. The indicia includes a plurality of alphabetic indicia used to form sentences. U.S. Pat. No. 4,713,008, issued to Stocker, discloses a method of teaching language sounds by associating each symbol with an event or phonetic phenomenon, which produces the sound. U.S. Pat. No. 5,133,665, issued to Engle, discloses a book customized to teach letters, numbers, and words such as a child's name. The front cover has a window or opening through which letters can be seen. The series of letters is formed by having pages of different widths. U.S. Pat. No. 5,788,503, issued to Shapiro, discloses a book designed to help children to read using building blocks of the English language in the form of a 'tri-gram' wherein the first card comprises a consonant, second card a vowel, and third card consonant.

The foregoing shows various educational devices known in the art. As is readily apparent, the background art devices do not disclose an educational reading system and method that combines images with letters that illustrate the letter's sound, allows children to easily mix and match letters to explore the sounds and spellings of combined letters, as contemplated by the instant invention. If such a device existed, it would be well received. The instant invention addresses this unfulfilled need in the prior art.

BRIEF SUMMARY OF THE INVENTION

In light of the foregoing, it is an object of the present invention to provide a tool device and system for teaching reading.

It is another object of the instant invention to provide a device, system and method for teaching reading by exploring the sounds of letters in reference to corresponding pictures.

It is a further object of the instant invention to provide a device, system and method for teaching reading by conveying the sounds of letters with pictures and facilitating the convenient combination of letters to practice sounds and the spelling of words.

It is an additional object of the instant invention to provide a device, system and method for teaching reading by illustrating the sounds of letters in reference to corresponding pictures and providing for differentiating short vowel sounds from long vowel sounds.

It is also an object of the instant invention to provide a device, system and method for teaching reading that is color coded to differentiate simple sounds from complex sounds.

It is another object of the instant invention to provide a device, system and method for teaching reading that facilitates the teaching of beginning sounds and ending sounds.

It is still a further object of the instant invention to provide a device, system and method for teaching reading that makes it convenient to mix and match letters.

It is still an additional object of the instant invention to provide a device, system and method for teaching reading that is color coded to differentiate simple sounds from complex sounds.

It is another object of the instant invention to provide a device, system and method for teaching reading that provides for virtually an unlimited number of letter combinations for producing simple sounds and complex sounds.

In light of these and other objects, the instant invention comprises a book-like reading teaching tool having a plurality of columns wherein each column contains each letter of the alphabet in ascending format, which are simultaneously viewable, a picture corresponding to each sound of each letter in the alphabet and structure for interchanging, mixing and matching letters and identifying and selecting long vowel and short vowel sounds. The reading tool includes a front cover, back cover, spiral binder, instructions, alphabet indicia, plurality of pictures corresponding to each letter and sound in the alphabet, plurality of windows or cutouts corresponding to selected letters and sounds, short vowel sound indicia, long vowel sound indicia, soft consonant indicia, hard consonant indicia and plurality of flip panels arranged in columns wherein each panel in each column contains a letter indicia. The covers, pages and panels have a plurality of apertures that are joined at coinciding ends by the spiral binder. The windows are formed in the second page over pictures corresponding to letters having only one sound or one common sound, such as the letter "B." The instructions indicate how to form words and sounds using the panels and also include suggested beginning sounds, set of suggested complex beginning sounds, set of suggested ending sounds and set of suggested complex ending sounds.

DETAILED DESCRIPTION OF THE INVENTION

Figure 1:
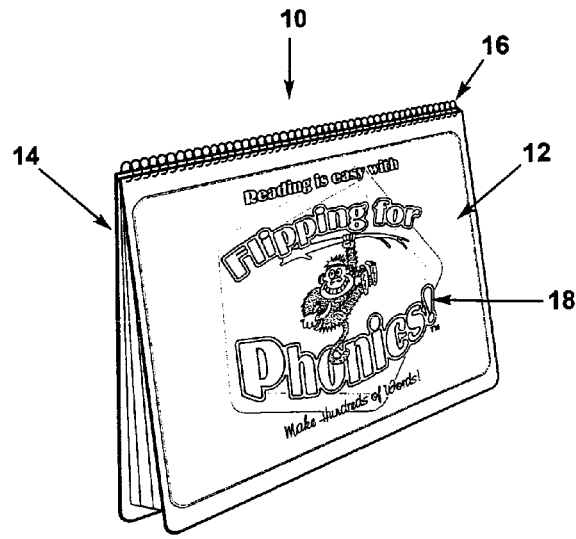
FIG. 1 is a perspective view of the preferred embodiment of the teaching tool in accordance with the instant invention.
Figure 2:
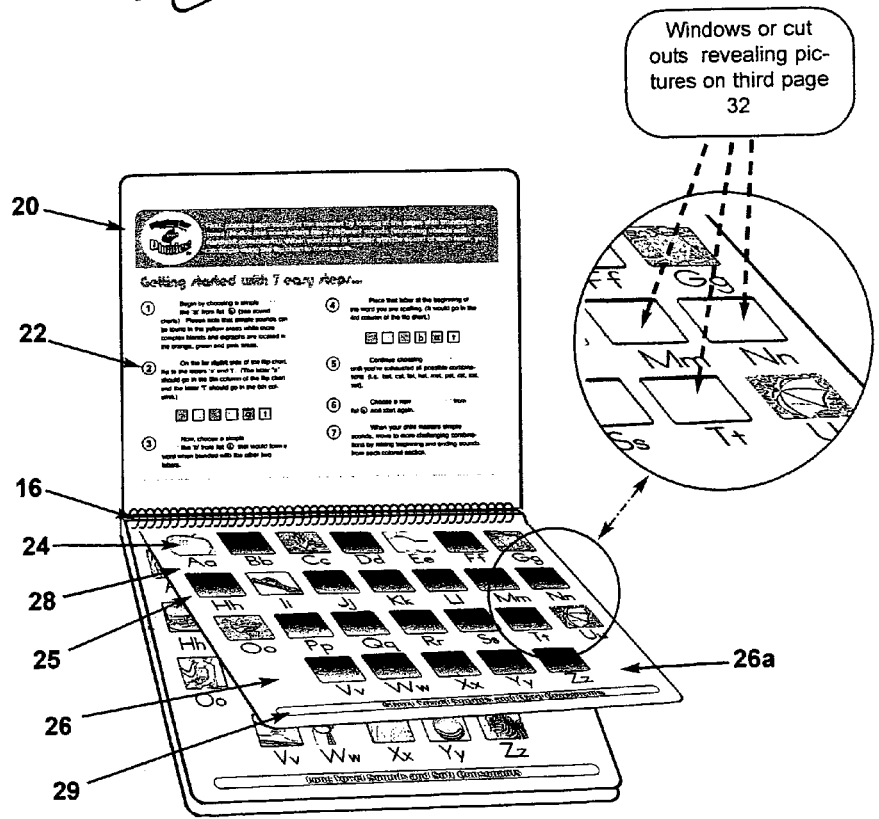
FIG. 2 is an elevational view of the preferred embodiment of the teaching tool in accordance with the instant invention illustrating the first and second pages of the teaching tool.
Figure 3:
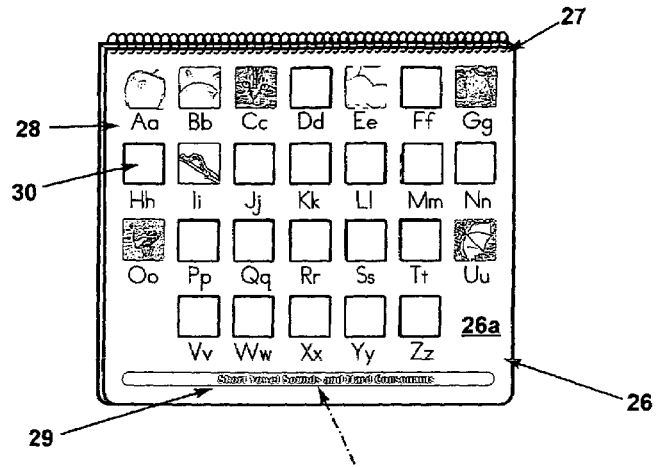
FIG. 3 is a perspective view of the preferred embodiment of the teaching tool in accordance with the instant invention illustrating the second page of the teaching tool isolated from the rest of the book comprising the teaching tool.
Figure 4:
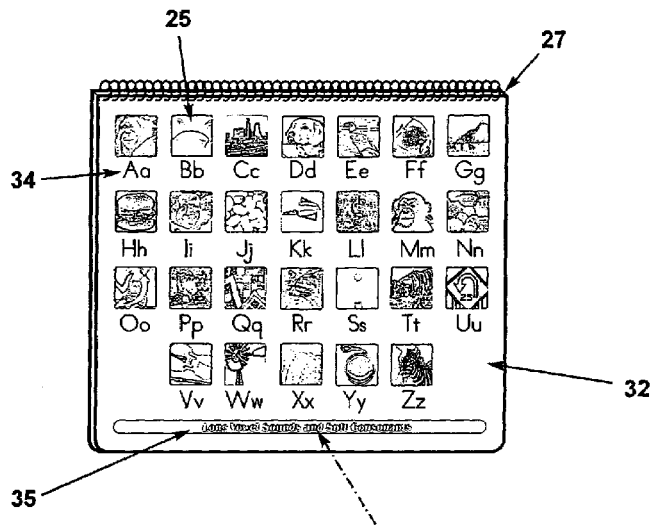
FIG. 4 is an elevational view of the preferred embodiment of the teaching tool in accordance with the instant invention illustrating the fourth page of the teaching tool isolated from the rest of the book comprising the teaching tool.

With reference to the drawings, FIGS. 1–6 depict the preferred embodiment of the instant invention which is generally referenced as a teaching tool and, or by numeric character 10. With reference to FIGS. 1–6, the teaching tool 10 comprises a book-like structure having a front cover 12, back cover 14, spiral binder 16, cover indicia 18, first page 20, first set of instruction indicia 22 on the first page 20, second page 26, alphabet indicia 28 on a first side 26a of the second page 26, plurality of pictures 24 on the first side 26a of the second page 26 corresponding to selected letters 27 having more than one sound, short vowel sound indicia 29, plurality of windows or cutouts 30 defined by the second page 26 corresponding to selected letters 28 having one sound, third page 32 having a second set of alphabet indicia 34 and plurality of pictures 25 on a first side 32a of the third page 32 wherein each picture corresponds to a different letter 34, long vowel sound indicia 35, second set of instruction indicia 36 on a second side 32b of the third page 32, and plurality of flip panels 40 arranged in columns wherein each panel 40 in each column contains a letter indicia 42. The covers 12, 14, pages 20, 26, 32 and panels 40 have a plurality of apertures 27 that are joined at coinciding ends by the spiral binder 16. The windows 30 are formed in the second page 26 over pictures corresponding to letters 28 or 34 having only one sound or one common sound, such as the letter "B." The first set of instructions 22 provide overall instructions for forming words and sounds using the teaching tool 10. The second set of instructions 36 provide instruction indicia related to using the panels 40 to form words and sounds and indicia comprising a set of suggested beginning sounds, set of suggested complex beginning sounds, set of suggested ending sounds and set of suggested complex ending sounds.

Figure 5:
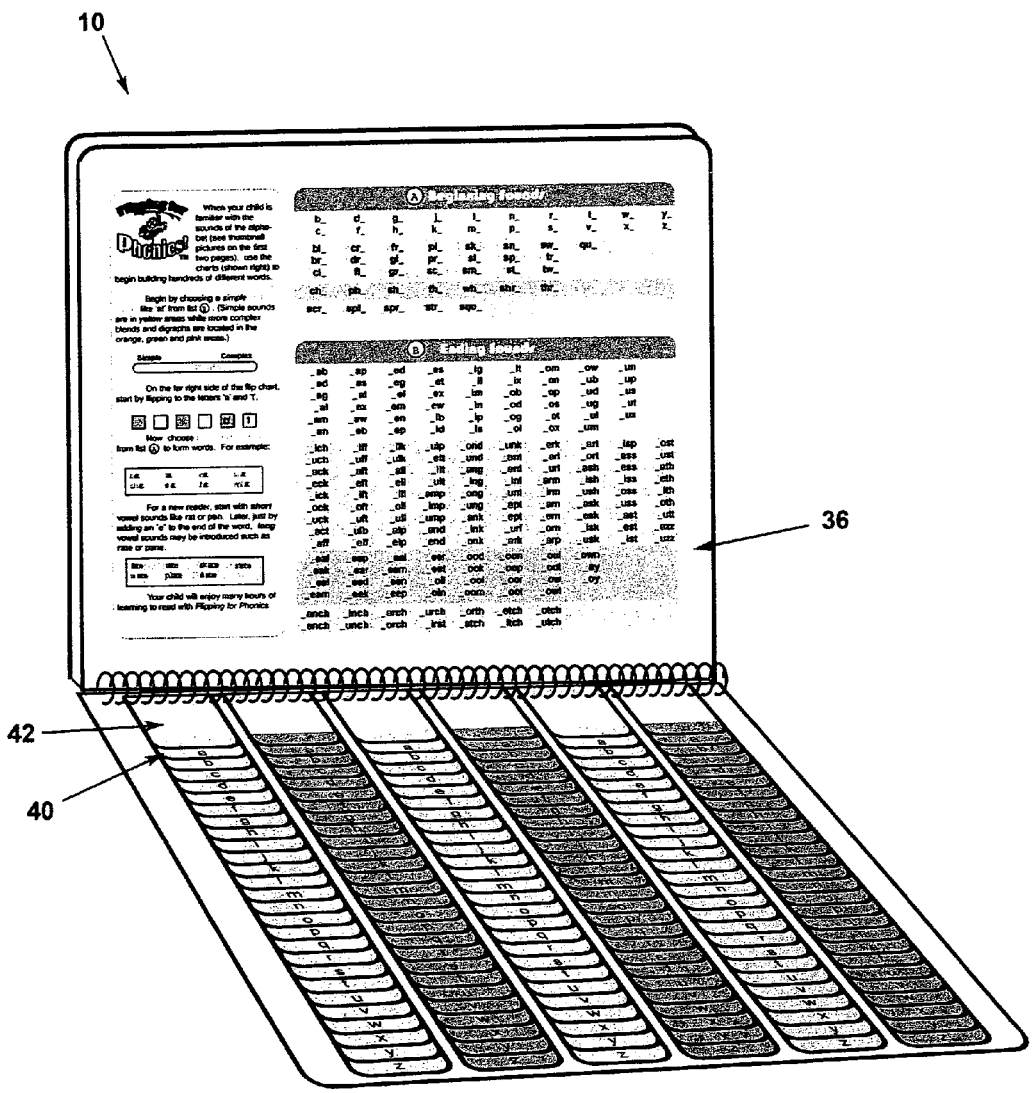
FIG. 5 is a perspective view of the preferred embodiment of the teaching tool in accordance with the instant invention illustrating the fifth page of the teaching tool and plurality of interchangeable panels.
Figure 6:
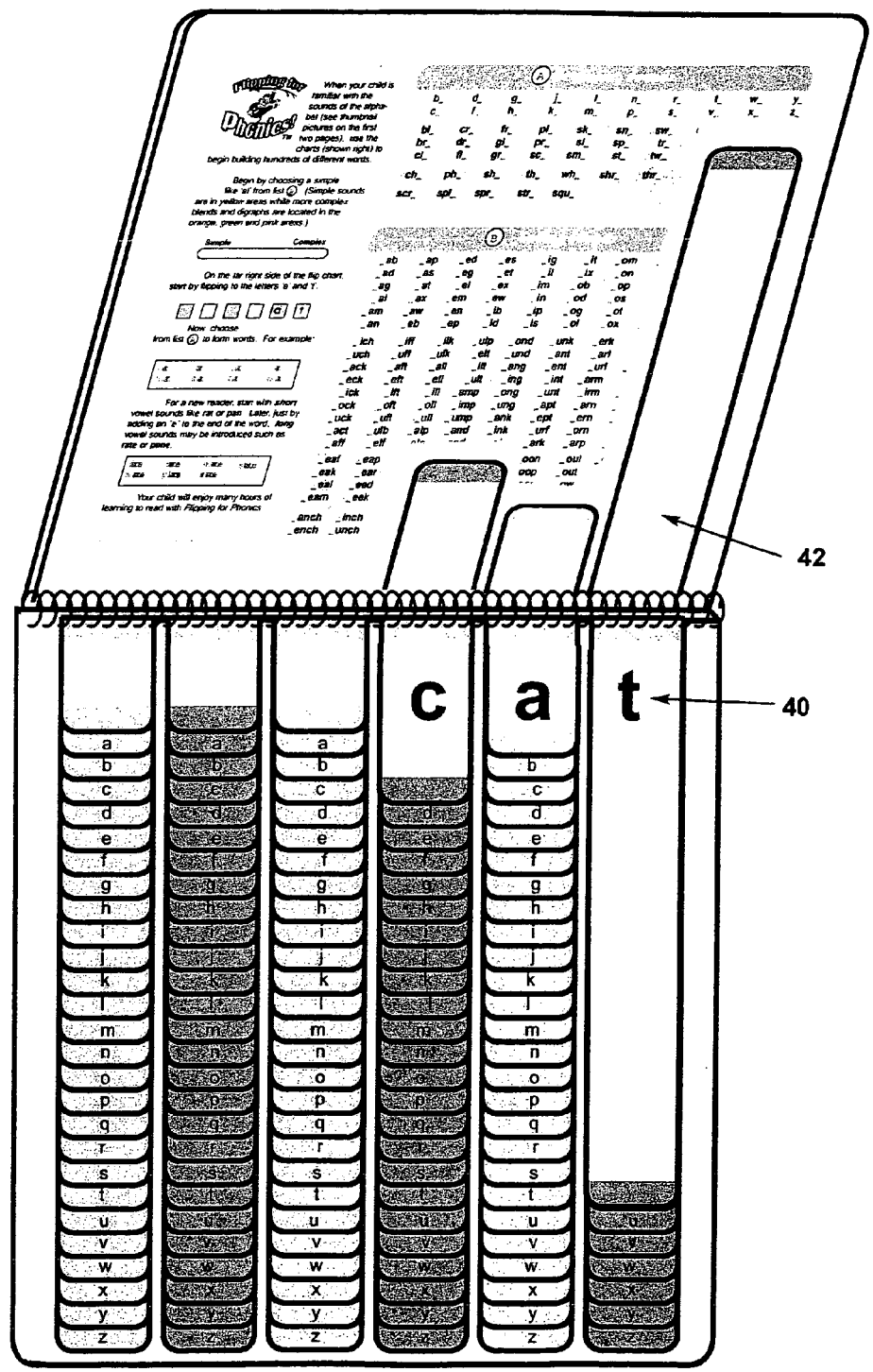
FIG. 6 is a perspective view of the preferred embodiment of the teaching tool in accordance with the instant invention illustrating the plurality of interchangeable panels and the first set of panels flipped over to expose the first set of letters, i.e. "a".

With reference to FIGS. 5 and 6, the invention 10 preferably comprises twenty-six (26) panels 40 in each column, one for each letter, and a first blank panel 42 for covering the first row of letters, i.e. "A." There are preferably five or six columns of panels 40. Each panel has different letter indicia wherein the indicia comprises a first letter in a large font that is viewable when the preceding panel 40 is lifted and a second letter being the same as the first letter but in a smaller font placed at the bottom edge of the panel 40 so it is visible when the preceding panel is down. This allows the user to see and select panels having the letter they want to use. The short vowel indicia 29 indicate that the vowels on the corresponding page have a short sound. The long vowel indicia 35 indicate that the vowels on the corresponding page have a long sound. By following the instructions 22, 36 and selecting panels 40, different sounds and words may be formed. The lower edge of the panels 40 are color coded to facilitate more convenient use and provide visual contrast.

The instant invention 10 is used by following the first and second set of instructions. The first set of instruction indicia 26 suggest that each sound of the alphabet should be practiced before beginning by looking at the pictures 24, 25 corresponding to each letter. Next, the user selects a group of letters from the ending sounds on the second side 32*b* of the third page, which may also be identified as page 4. The ending sounds are formed using the column of panels 40 on the far right side. Next the user selects a letter or letters for the beginning sounds and places that letter by flipping the panels at the beginning of the ending sound. The user continues to practice by choosing beginning sounds to match the ending sounds until the possibilities have been virtually exhausted. Next, the user can select a new ending sound and start the process over by matching it with beginning sounds. The second set of instruction indicia 36 restates the first set of instructions 22 and includes charts of beginning and ending sounds.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A tool for teaching reading, said tool comprising:
   a first alphabet page having a first side and a second side;
   a first set of alphabet indicia on said first side of said first alphabet page comprising letters from the alphabet;
   first set of picture indicia on said first side of said first alphabet page phonically corresponding to at least a portion of said letters on said first page wherein said indicia facilitates ascertaining at least the first letter and sound of the first letter;
   means, defined by said first page, for differentiating letters having one sound from letters having more than one sound.;
   a second alphabet page having a first side and a second side;
   a second set of alphabet indicia on said first side of said second alphabet page comprising letters from the alphabet;
   second set of picture indicia on said first side of said second alphabet page phonically corresponding to at least a portion of said letters on said second alphabet page wherein said indicia facilitates ascertaining at least the first letter and sound of the first letter; and
   a plurality of columns, each of said columns comprising a plurality of panels corresponding to the number of letters in the alphabet, each of said panels in each column having a different letter indicia thereon.

2. A reading teaching tool as recited in claim 1, wherein said letters differentiating means comprises:
   a picture indicia on said first side of said first alphabet page corresponding to each letter of said first set of alphabet indicia having more than one phonetic sound;
   a plurality of windows defined by said first alphabet page wherein each of said windows corresponds to a different letter of said first set of alphabet indicia having only one phonetic sound.

3. A reading teaching tool as recited in claim 1, further comprising:
   instruction indicia on at least one side of at least one page for conveying instructions on forming sounds and words and using said tool.

4. A reading teaching tool as recited in claim 1, further comprising:
   means for rotatably securing common edges of said first alphabet page, said second alphabet page and said panels such that said pages and panels may be pivotally flipped.

5. A reading teaching tool as recited in claim 4, further comprising:
   a front cover; and
   a back cover.

6. A reading teaching tool as recited in claim 4, wherein said rotatable securing means comprises a spiral binder.

\* \* \* \* \*